US010964180B2

(12) United States Patent
Engler et al.

(10) Patent No.: US 10,964,180 B2
(45) Date of Patent: Mar. 30, 2021

(54) INTRUSTION DETECTION AND NOTIFICATION DEVICE

(71) Applicant: HEWLETT PACKARD ENTERPRISE DEVELOPMENT LP, Houston, TX (US)

(72) Inventors: David W. Engler, Cypress, TX (US); William James Walker, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 24 days.

(21) Appl. No.: 15/992,580

(22) Filed: May 30, 2018

(65) Prior Publication Data

US 2019/0371139 A1   Dec. 5, 2019

(51) Int. Cl.
| G08B 13/14 | (2006.01) |
| G08B 13/12 | (2006.01) |
| G08B 29/18 | (2006.01) |
| G08B 29/16 | (2006.01) |
| G08B 25/00 | (2006.01) |

(52) U.S. Cl.
CPC ....... *G08B 13/1427* (2013.01); *G08B 13/126* (2013.01); *G08B 25/008* (2013.01); *G08B 29/16* (2013.01); *G08B 29/185* (2013.01)

(58) Field of Classification Search
CPC .......................... G08B 13/1427; G08B 13/126; G08B 25/008; G08B 29/16; G08B 29/185
See application file for complete search history.

(56) References Cited

U.S. PATENT DOCUMENTS

| 8,138,918 B2 | 3/2012 | Habib et al. |
| 8,201,266 B2 | 6/2012 | Campbell et al. |
| 9,507,965 B2 | 11/2016 | Berger et al. |
| 9,530,031 B2 | 12/2016 | Terada et al. |
| 9,913,409 B2 | 3/2018 | Cutler et al. |
| 10,096,216 B1* | 10/2018 | McClintock ....... G08B 13/1436 |

(Continued)

OTHER PUBLICATIONS

Kumar, P. et al., "Arduino Based Wireless Intrusion Detection Using IR Sensor and GSM," IJCSMC, vol. 2, Issue. 5, May 2013, pp. 417-424.

*Primary Examiner* — Brian A Zimmerman
*Assistant Examiner* — Kevin Lau
(74) *Attorney, Agent, or Firm* — Nolte Lackenbach Siegel (57) ABSTRACT

Software intrusion protection systems to prevent remote access to sensitive data are very prevalent. In some cases, additional physical access protection may also be desired. By preventing physical access to a system an intruder may not be able to physically "steal" component parts of the system and then obtain their contents (or design criteria) at a remote site (e.g., after the physical theft). Monitors are provided to detect potential access to a secure computer system and identify if inappropriate access to the secure computer system is obtained (or is imminent). In a case where unauthorized access is predicted, warnings and alerts may be sent prior to an actual breach. Upon determination that a breach may be likely to occur, techniques to protect data (e.g., erasure, destruction, etc.) and component parts may be initiated. Sensors monitor internal and external physical environmental conditions to assist in detection of intrusion.

20 Claims, 8 Drawing Sheets

(56) References Cited

U.S. PATENT DOCUMENTS

| | | | |
|---|---|---|---|
| 2005/0055568 A1* | 3/2005 | Agrawala | G07C 9/00111 726/2 |
| 2006/0064486 A1* | 3/2006 | Baron | H04L 41/0886 709/224 |
| 2008/0025229 A1* | 1/2008 | Beliles | H04L 63/1433 370/245 |
| 2009/0212945 A1* | 8/2009 | Steen | G06F 21/86 340/541 |
| 2013/0173829 A1* | 7/2013 | Chan | G06F 21/00 710/17 |
| 2016/0154089 A1* | 6/2016 | Altman | G01S 7/52004 367/124 |
| 2017/0018167 A1* | 1/2017 | Dey | G08B 25/008 |
| 2017/0277888 A1* | 9/2017 | Robinson | G06F 21/86 |
| 2018/0025616 A1* | 1/2018 | Lin | G08B 29/185 340/501 |
| 2019/0013960 A1* | 1/2019 | Sadwick | G08C 23/04 |

* cited by examiner

INTRUSTION DETECTION AND NOTIFICATION DEVICE

BACKGROUND

In the field of network computing, security is usually a very high priority requirement. In some cases, security may even be an extreme requirement. For example, banking systems and military systems may fall into the category of systems that require extreme security. Security from intrusion has at least two distinct aspects. Firstly, access security refers to network security such that an intruder does not gain "access" in the form of computer access (usually remotely) to data on a system. A second access security refers to "physical" security such that an intruder does not gain "access" to a physical device or obtain entry into a secure location of a building (e.g., secure computer room). This disclosure is mainly directed to detecting and protecting physical security aspects of a computer system. The disclosed systems and methods may be integrated with other computer systems, including systems protecting data access intrusion (i.e., non-physical remote access intrusion), to provide a comprehensive intrusion protection system for a customer network and devices on that network.

Physical security begins with maintaining security to a building or room within a building at a secure location. Often, some areas within a building or campus are expected to have a higher security requirement than others. It may be the case that certain rooms have additional "key-card" access requirements such that only certain personnel (e.g., based on business role or security clearance, etc.) may gain access to those rooms. If physical security is breached to a building, a next breach may be to a device itself. The disclosed system represents an improvement to the technical field of computer system security by enhancing the capabilities and monitoring functions of a computer system itself to work in conjunction with other security systems (building and software) to prevent unexpected access to data or device components of the computer system.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. Also, to assist in readability not all identical elements are provided reference numbers within a given drawing. However, elements that are labeled identically may be considered additional instances of the identical element with a reference number. For a detailed description of various examples, reference will now be made to the accompanying drawings, in which.

DETAILED DESCRIPTION

Intrusion detection is becoming more important as security becomes more important. Detecting the movement of a computer system (e.g., server) or changes in proximity of machines or people within a server environment may precede any physical intrusion event. Having an enhanced ability to detect, notify, and log unexpected movement may be beneficial to security conscious customers. Accordingly, the disclosed intrusion protection and notification device represents an improvement to the technical field of computer security and disclosed reporting, predicting, detecting, and logging, functions may assist to better secure sensitive computer systems, their data, and their components.

The disclosed intrusion protection and notification device may integrate with room access control functions and monitor activity within a secure location (e.g., a secure computer room) to "predict" physical intrusion potential and increase monitoring activity and response actions based on an increased threat level. For example, if a card reader indicates a potential breach at an exterior door of a facility or an alarm system has detected possible break-in. Also, remediation actions may be taken to protect sensitive data in the event that physical access to a computer system becomes imminent.

As used herein, the term "secure computer room" refers to an area having limited (e.g., restricted) access. There may be varying degrees of security measures for a secure computer room as described herein. For example, a secure computer room may have a sign that says "authorized personnel only" with no lock on the door. A higher degree of security could be achieved by placing a lock on the door. A still higher level of security could be achieved by having a card reader or biometric scanner at all access points of the secure computer room. In all cases, a secure computer room refers to an area where access by unauthorized individuals may present a security risk. Different levels of security measures may be implemented based on sensitivity of information and machines within the designated restricted access area (e.g., secure computer room).

The disclosed intrusion protection device (IPD) is contemplated to be integrated internally within the chassis of a computer system and monitor internal and external environmental parameters to determine if a breach is occurring or likely to occur. Multiple sensors are included on the IPD and redundant communication links may be provided from the IPD to other computer infrastructure and monitoring systems. Additional sensors such as an accelerometer, motion detector, hygrometer, photocell, and radio frequency (RF) received signal strength indicator (RSSI) may be included in an IPD and used to detect server motion and server intrusion. Internal processors and capabilities of the IPD may be configured to protect data and devices in the event of a breach. Protection techniques may include automatic encryption of data or actual destruction of data or component parts depending on requirements and sensitivity factors with respect to the computer system, its data, and its component parts.

In one example implementation, a module (e.g., hardware module) may include an accelerometer (plus other sensors) to detect X, Y, Z vibration, motion, and acceleration. This acceleration may be used to mathematically calculate velocity and distance traveled. In a related example, use of RSSI values may assist to identify changes to estimate location. In this example, one reason the RSSI may change is as a result of a change in distance from the transmitter. Measuring RSSI value changes in conjunction with accelerometer information may be a method to calculate an updated position and velocity If a movement event is detected, a customer may be notified, and logs may be created. If an unexpected movement occurs additional notifications or alarms/alerts may be generated.

In one case, the accelerometer may be physically mounted on a hardware module that is attached to motherboard/server (possibly with redundant communication paths). The hardware module may be configured to log information and notify server system and other customer applications as necessary. In addition to motion detection of the computer system itself, one or more wireless receivers (e.g., Bluetooth, Ethernet, etc.) may be used to measure changes in RSSI (Received Signal Strength Indicator) of signals present within a computer room. For example, other computer systems transmitting wireless protocols. Changes in RSSI may indicate a change in RF strength, which implies movement or RF energy absorbing body (e.g., human being) in vicinity of server (or movement of the signal sender or sensor). That is, an entity such as a person or object may obstruct the path of the signal from the source to the system measuring the RSSI, and a reduction (or increase) in RSSI would indicate movement of the entity within the computer room. An increase in RSSI could be observed if the source device were moved closer to the sensing device or if some sort of signal reflective material amplified the signal to the sensor within the computer room. Any of these types of changes, in an otherwise largely static environment of an empty (with respect to people) computer room, may be considered a pre-intrusion event.

Additionally, a motion detector internal to a computer system may be used to sense thermal changes within the server and a photocell (e.g., infra-red and/or ambient light sensor) may be used to sense changes in optical properties (e.g., light) within a closed chassis of a computer system. Each of these additional "internal" sensors (i.e., sensors that measure internal characteristics of a computer system) may provide an additional level of post-intrusion validation.

Figure 1:
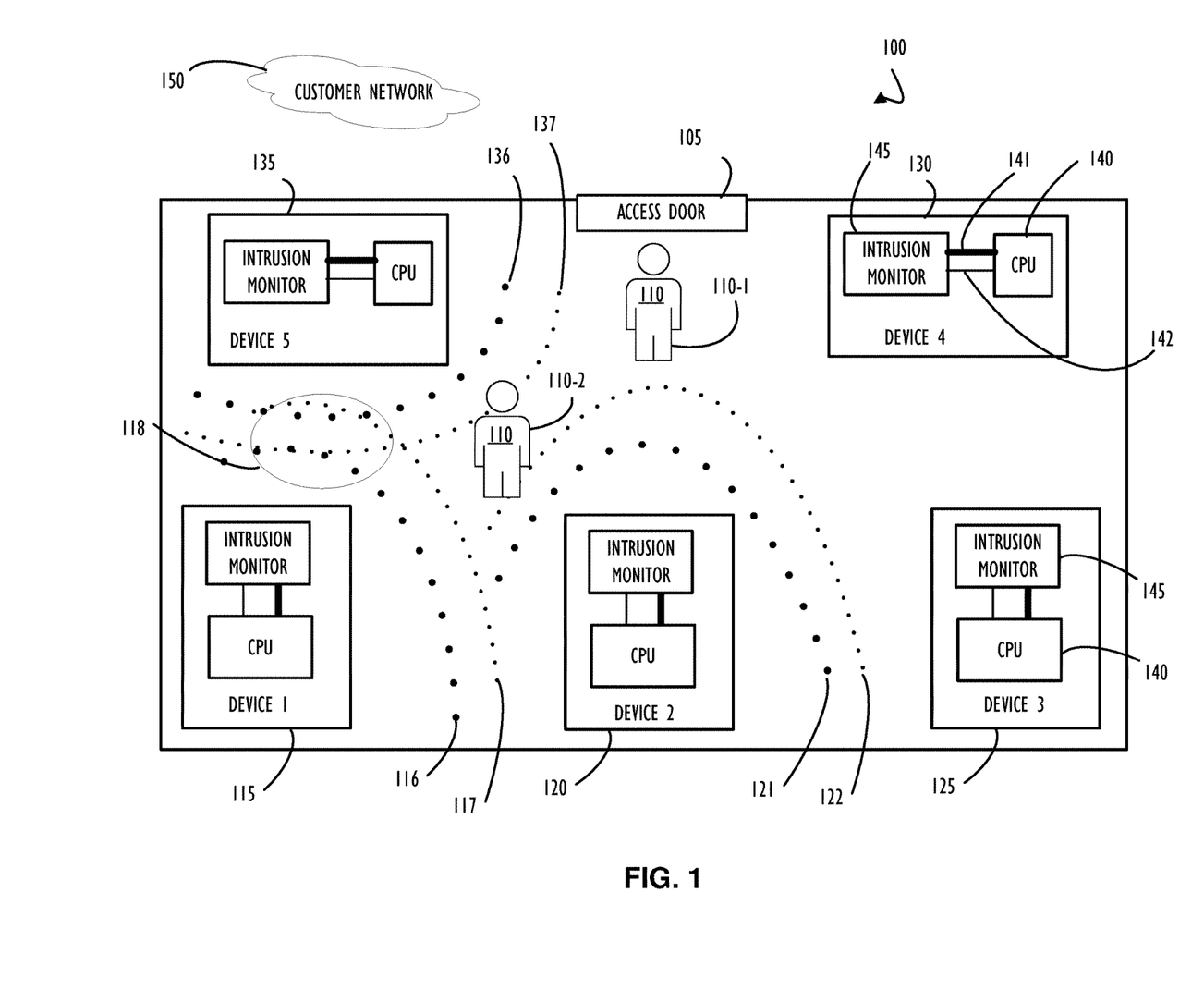
FIG. 1 is a functional block diagram of a computer room and multiple devices configured with an intrusion monitor device, according to one or more disclosed implementations.

Referring now to FIG. 1, an example computer room 100 is illustrated. In this example, computer room 100 includes an access door 105, and five distinct computer systems (device 1 (115), device 2 (120), device 3 (125), device 4, (130), and device 5 (135)). Of course, any number of computer systems may be present in a computer room. Customer network 150 may connect devices within computer room 100 with each other or with other corporate computers outside of computer room 100. Customer network 150 may also be connected to a network within computer room 100 through a secure firewall (not shown) or other type of non-physical access security mechanism (e.g., software intrusion protection system). Computer room 100 may also have motions sensors (not shown) and video recording capabilities (not shown) to indicate/record an occupants actions within computer room 100. Each of these sensors that are physically external to computer systems (but possibly communicatively coupled to customer network 150, for example) may represent further security measures to assist the disclosed intrusion monitor (145) and disclosed intrusion detection techniques.

Access door 105 may be connected to a card-reader (not shown) that authenticates access to the computer room. A card-reader may be communicatively coupled to other computer systems of an organization and include biometric sensors or other types of authentication depending on security requirements of the computer room. Other card-readers and authentication systems may be present at doors external to computer room 100 and may be monitored such that computer systems within computer room 100 may be aware of anyone having physical access to an external portion of access door 105. That is, computer systems within computer room 100 may be aware of potential access to computer room 100 prior to an actual activation of access door 105. In this manner, when a person 110 has entered a hallway or other conduit (e.g., elevator) that may lead them to access door 105 the computer systems within computer room 100 may increase their monitoring of the physical environment of computer room 100 in case access door 105 is breached without additional warning. For example, if access door 105 malfunctions and person 110 can obtain access to computer room 100 without a notification from access door 105 itself, then the heightened environmental monitoring may alert computer systems (e.g., device 1 (115) through device 5 (135)) within computer room 100 of an occupant.

Each computer system in computer room 100 includes a CPU 140 and an intrusion monitor 145 as illustrated for device 4 (130). A standard communication path 142 communicatively couples CPU 140 to intrusion monitor 145 and a backup (i.e., redundant) communication path is illustrated as bold line 141. A redundant communication path may allow communication in an event where power is terminated to a device or other event compromises standard communication path 142. Redundant communication path may be wired or utilize a wireless communication protocol such as near field communication (NFC) or radio frequency identification (RFID) technologies. A goal of redundant communication path 142 is to ensure communication to CPU if an intrusion event is suspected or has compromised standard communication path 142 in any way.

Dotted lines 116 and 117 represent field propagation of wireless signals from (and to) device 1 (115). Similarly, dotted lines 121 and 122 represent fields associated with device 2 (120) and dotted lines 136 and 137 for device 5 (135). In this example a person 110 standing at location 110-1 may not affect wireless signals between devices 1 (115), 2 (120), and 5 (135) but may begin to affect these signals (e.g., through absorption of an RF signal) when they are at position 110-2. Further, areas where signals overlap considerably, as shown at area 118, absorption or reflection of signals may be even more observable and detectable by each device independently. In some embodiments, devices may communication variations in received signal strength indicators (RSSI) amongst each other and be able to collectively determine a possible intruder. In some implementations, absolute values of RSSI may not be as significant as detecting changes in RSSI for an environment that, as described above, should remain relatively static. Clearly, if access door 105 has not previously indicated an access grant, unexpected presence of an entity acting as an absorption body (e.g., person 110) may indicate an intrusion to computer room 100. Accordingly, if devices within computer room 100 detect variations in their RSSI measurements they may begin further heightened detection and "prepare" for a possible physical intrusion (e.g., encrypt data, prepare for destructive actions, issue alerts, etc.). Further, using this type of advance warning a device may take (or refresh) baseline measurements of its accelerometer and other sensors so that deviations from that baseline may be more easily determined.

Figure 2:
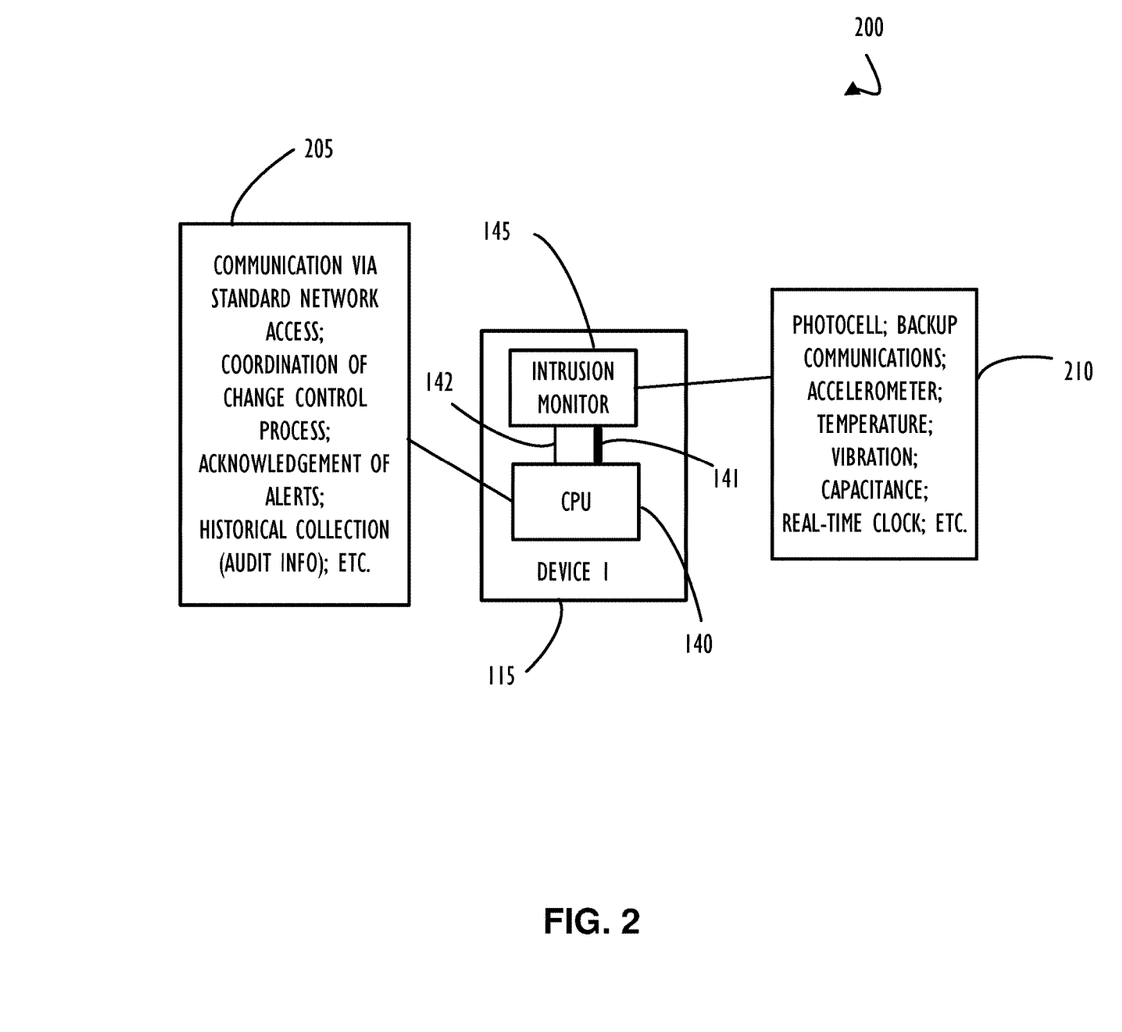
FIG. 2 is a functional block diagram representing a first example of an intrusion monitor device communicatively coupled to a central processing unit (CPU) of a secure computer system, according to one or more disclosed implementations.

Referring now to FIG. 2, block diagram 200 illustrates device 1 from FIG. 1 and includes a block representation of some of the capabilities that may be present for CPU 140 and intrusion monitor 145. Block 205 represents some functional capabilities that may be implemented as software modules (or applications) that are configured to execute on CPU 140 of device 1 (115). Capabilities include but are not limited to, communication via standard network access (e.g., customer network 150). Coordination of change control process within an organization. For example, if maintenance is scheduled for a device within computer room 100, for example, the device for which maintenance is scheduled and other devices within a proximity of that device may be "informed" that an authorized presence may occur in computer room 100 at the scheduled time. Accordingly, devices within computer room 100 may treat the scheduled presence as aggressively as they might treat an unauthorized presence. Further, alerts from a device scheduled for maintenance may be disabled during the maintenance window so as to not create false alerts. Integration to a change control process and change management system of an organization may allow intrusion monitor 145 and its companion CPU 140 to more accurately provide a secure environment. Block 205 also indicates that CPU 140 may be integrated with a security alert function to allow for acknowledgement of alerts from system administrators for an organization (e.g., via customer network 150). Finally, block 205 indicates that CPU 140 may also be involved with historical data collection including audit information as well as other possible functions. In general, CPU 140 may execute functions to integrate actions of intrusion monitor 145 with other external organizational processes and information technology functions.

Block 210 represents some functional capabilities associated with intrusion monitor 145. As briefly explained above, intrusion monitor 145 may include a variety of sensors and be in communication with a number of external sensors to detect abnormal (or unexpected) physical activity with respect to device 1 (115). Block 210 indicates that a sensor may include a photocell sensor (e.g., infra-red and/or ambient light sensor) that may determine a change in ambient light within a chassis of a computer system. For example, if a hole were drilled into the chassis, a cover plate removed, or a lid opened. Any of these actions would likely change the amount of light present within the internal area of device 1 (115) and may indicate intrusion. Block 210 also indicates that intrusion monitor 145 may include a backup communications capability such as cellular communication capability or a dedicated WiFi network connection. These backup communication techniques may be used if standard communication to CPU using communication path 142 and redundant communication path 141 are compromised. Block 210 also indicates that intrusion monitor 145 may include an accelerometer to detect vibration or movement of device 1 (115). Further sensors may include a temperature sensor, a vibration sensor (in addition to the accelerometer), a capacitance sensor to determine if a person is touching the chassis, a real-time clock (RTC) mechanism to maintain time to a high degree of precision, or other sensors known to those in the art. The RTC mechanism may be used to detect RTC time/date changes by providing alternate, non-standard accurate time keeping. For example, if the host RTC and security module RTC experience a deviation, then an indication that the host RTC was modified may be generated. In general, any number of sensors may be included and integrated in accordance with the aspects of this disclosure to augment the ability for device 1 (115) to determine if unexpected physical access occurs or may be imminent.

Figure 3:
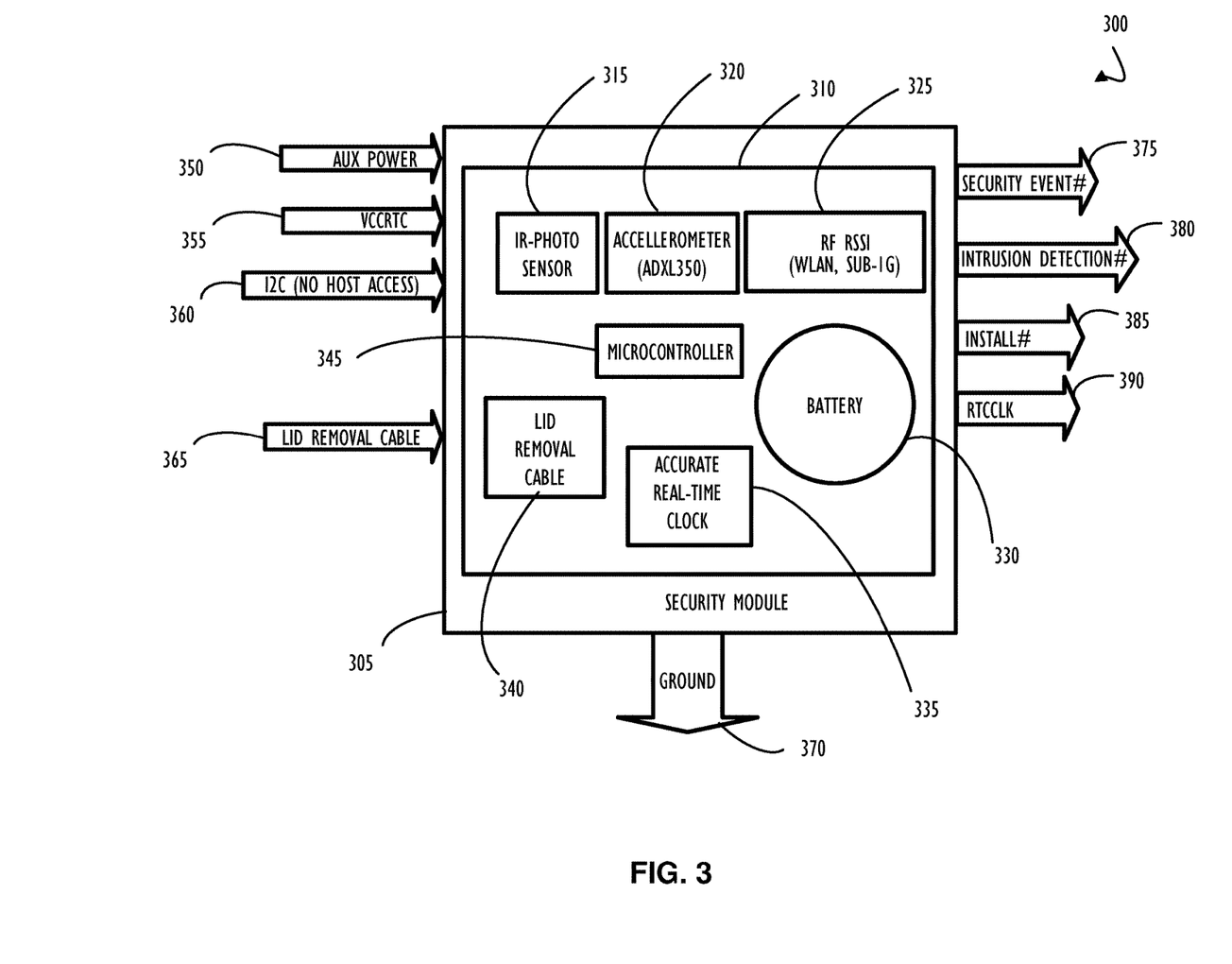
FIG. 3 is a functional block diagram representing a first example of an intrusion monitor device alone and its possible internal components, according to one or more disclosed implementations.

Referring now to FIG. 3, functional block diagram 300 represents one example of an intrusion monitor device illustrated, in this example, as security module 305 having several possible internal components, according to one or more disclosed implementations. Security module 305 may be implemented as a circuit board with peripherals that plugs into a mother board of a computer system or may be implemented as a device connected by a communication cable to a CPU of the computer system. In one implementation, security module 305 may be implemented as a mezzanine mount block (MLB). Regardless of the actual form factor, example peripherals for security module 305 are illustrated in functional block 310 of FIG. 3. Block 310 includes an IR-photo sensor 315 that may monitor light within a computer system (or around the computer system) and determine possible intrusion based on a change in the ambient light. For example, in a secure computer room, properties of light within a computer system should remain relatively constant. In some cases, there may be two baseline settings for when overhead lights of the computer room are on versus when overhead lights are off. As mentioned above, if a hole is made in the chassis or the lid is lifted, for example, ambient light within the chassis will likely change and may, possibly along with additional measurements, indicate a possible intrusion event. Note that illumination is a likely side-effect of an intrusion into instrument circuits or within a server chassis.

Continuing with block 310 of FIG. 3, block 320 illustrates and example accelerometer (e.g., an ADXL350) that may be included as part of security module 305. As explained above, an accelerometer may be able to detect even slight movement of a computer system, including vibration of someone walking nearby or of someone touching the chassis in addition to detecting substantial movement. This may be used to detect drilling, banging, moving, lid opening, etc. When substantial movement occurs, distance moved may be calculated to some degree of accuracy and reported back from intrusion monitoring system via any available communication link. RF-RSSI 325 represents a received signal source measuring element that may detect changes in signal strength to indicate that a foreign body (e.g., a human being or cart) has interrupted a signal from another computer system that is normally of a consistent strength. As explained above, variations in signal strength are an indication that some of the signal may have been absorbed or deflected and may represent a further indication of changes in a normally constant environment. Battery 330 represents an independent power source so that implementations of security module 305 may continue to function (possibly in a reduced capability mode) even with no power being supplied via a power cable or motherboard connection. Real-time clock 335 may be connected to allow security module 305 to maintain a very accurate time measurement and detect alteration of system clock. Further, having RTC 335 independent of a system clock may allow a security module 305 to log intrusion events with timing precision even if communication to a system clock has been lost. Block 340 indicates that security module 305 may have an interface to a lid removal detection mechanism to identify if all or portions of a chassis are removed. Microcontroller 345 may be used to execute computer instructions to coordinate activities and retrieve information from different sensors as well as interface to operations on a CPU communicatively coupled to security module 305.

Continuing with FIG. 3, security module 305 is illustrated with a set of possible inputs/outputs or connections. Auxiliary power may be supplied through input 350, a real time clock signal may be obtained through VCCRTC input 355 (note that VCCRTC is a power pin), Inter-integrated circuit (I2C) connection 360 may be used to interconnect with other computer boards within a computer system (e.g., device 115) such that the connection is completely contained within that same secured device. Lid removal Cable 365 may form a connection between an external lid detection mechanism and lid removal interface 340. Ground 370 may be used to ground security module 305 to assist in proper electrical conductivity of components. Output 375 may transmit security events to an internal CPU or to external monitoring systems (e.g., via backup communication modules (not shown)). Output 380 may similarly be configured to output intrusion detection information. Output 385 may be used to provide configuration information for security module 305 such as a firmware version number or other component information regarding versions of modules and the like. Output 390 may be used to provide a signal from RTC 335 to inform other components of the time reference of security module 305. All of these components, and possibly others, may work in a coordinated fashion to provide information regarding actual or anticipated intrusion events.

In additional embodiments, the combined output from multiple intrusion sensors may be used to form a unique identifier of an intrusion type, that may be referred to as an "intrusion fingerprint." For example, if RSSI values drop slowly from −30 to −90 that may be an indication that someone is slowly walking toward a computer system configured with the disclosed security module 305, for example. This assumption of a "slow walker" may be further affirmed if measurements from the accelerometer do not detect footsteps at the same time (e.g., sneaking up on machine). In another example, if a Y axis in the accelerometer crosses a threshold that may be an indication that the server is sliding out of rack. In another example, if the Z axis in the accelerometer crosses threshold that may be an indication that the lid is being lifted or removed. In yet another example, if the Y and Z axis of the accelerometer concurrently exceed a threshold that may be an indication that the server is being pulled out and front of server is drooping towards the floor (e.g., removed from a rack). Also, if the light sensor and lid intrusion become active then an indication that light is entering the system may be considered a confirmation of the lid opening. Note that drilling, hammering, removing lid, inserting flashlight, rolling of a server rack, etc. all may have uniquely identifiable signatures within a secure computer room. In any of these cases, and other, composite measurements may be defined to identify a type of intrusion and the system may be configured to communicate severity and type to a user (e.g., security guard or system administrator).

Figure 4:
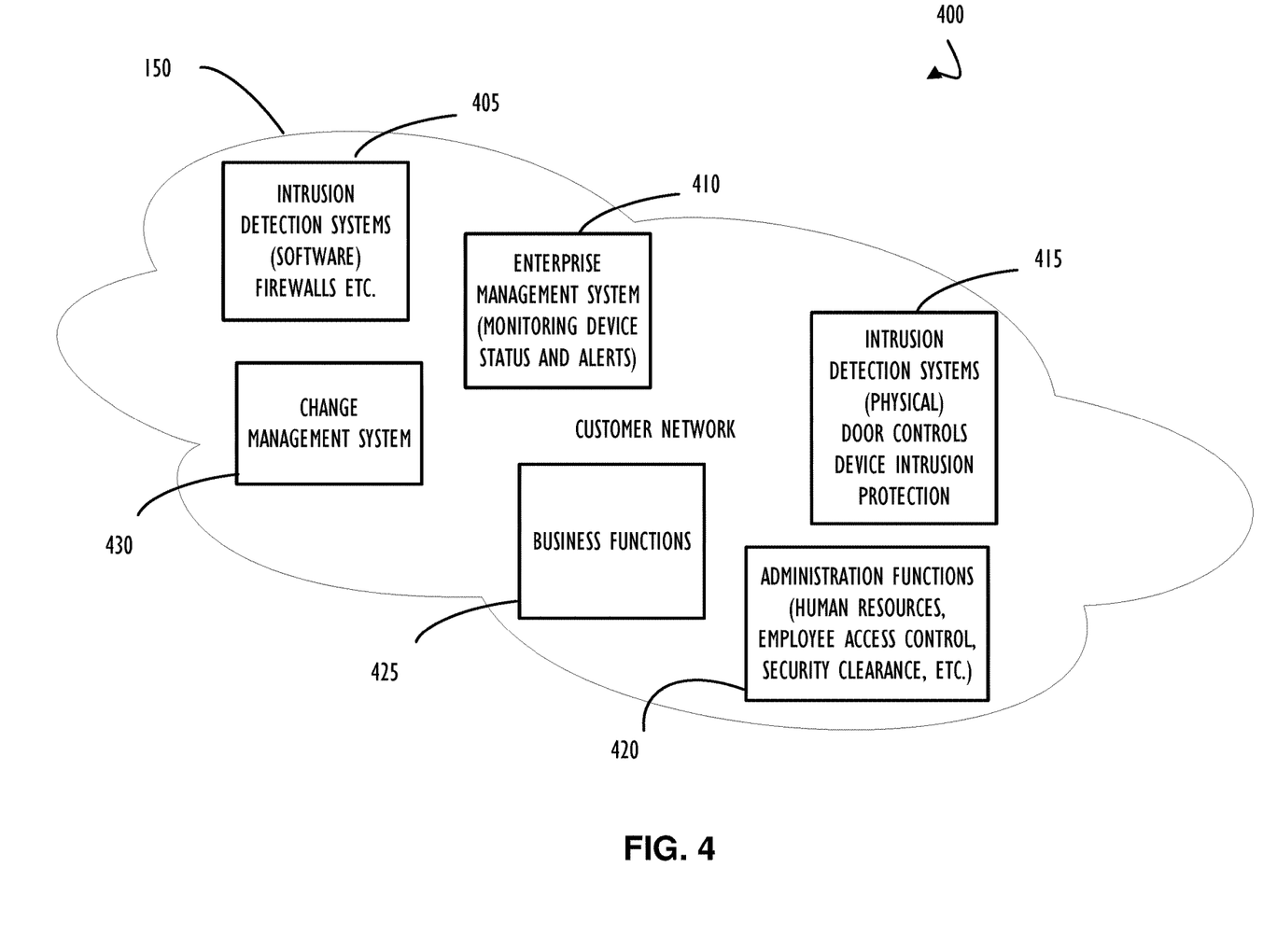
FIG. 4 is a block diagram representing a customer network and possible functions on a customer network (e.g., applications) that may be integrated with computer systems configured to include an intrusion monitor device, according to one or more disclosed implementations.

FIG. 4 is a block diagram 400 representing a customer network and possible functions on a customer network (e.g., applications) that may be integrated with computer systems configured to include an intrusion monitor device, according to one or more disclosed implementations. Customer network 150 is illustrated in FIG. 4 and contains several blocks to represent logical functions that may take place on a typical computer network for an enterprise. Each of these logical functions may have an interface to the disclosed intrusion detection and notification device to augment their functionality in interesting ways.

Block 405 illustrates that customer network 150 may include a standard software-based intrusion detection system including firewalls or other software security mechanisms. Clearly, the disclosed intrusion detection and notification device could be integrated with such a function to coordinate response activity to possible intrusion (or other security) events.

Block 410 illustrates that customer network 150 may include an enterprise management system to monitor devices and make sure that all business functions are available and properly performing. For example, if a device malfunctions or has a performance issue, alerts from the enterprise management system may be sent to system administrators to address any problems. When addressing certain problems, system administrators may need to enter a secure computer room. Accordingly, an overall system may provide information to the disclosed intrusion detection and notification system that changes to monitored values within a secure computer room may be about to take place. As a result, false alarms may be prevented.

Block 415 illustrates that customer network 150 may include an intrusion detection system for a building or campus facility that includes standard burglar alarm type functionality. This capability may also be integrated with the disclosed intrusion detection and notification device to provide a comprehensive solution to intrusion events. Also, if a physical break-in has been detected, the intrusion detection and notification device may increase its monitoring and determine to take more aggressive corrective action (e.g., destructive action for secure data or components) than if no physical break-in had been detected.

Block 420 illustrates that administration functions of customer network 150 may be integrated with the disclosed intrusion detection and notification device. For example, employees may have different security clearances and different employees entering a secure computing room such as computer room 100 may cause different actions to be taken when movement is detected within a secure device. For example, if an employee is determined to be in the proximity or touching a device for which they do not have clearance (even though they are allowed in the secure room) that device may automatically encrypt its data or issue an alert. Further action is also possible based on the level of "intrusion" by this supposedly reliable employee. In one example, if the employee removes the cover of a secure device to which they do not have authorized access, the secure device may treat that as an overt intrusion and destroy its contents and components.

Block 425 illustrates that customer network 150 may include business functions that may be integrated with the disclosed intrusion detection and notification device. One example may be to automatically initiate a transfer of business functions to a backup data center if an actual intrusion is detected and data has been destroyed at the primary data center. Other examples are certainly possible and should be apparent to those of skill in the art, given the benefit of this disclosure.

Finally, block 430 illustrates that customer network 150 may include a change management system. A change management system may be used by system administrators and business personnel to coordinate outages and upgrades of computer systems supporting overall business functions. With respect to change management system 430 an internal audit capability may be realized by using intrusion detection system to detect authorized entry into a computer system. For example, if maintenance is scheduled on a specific computer device and it is known that in order to provide the proper maintenance the lid must be removed, for example. The disclosed intrusion protection system can be used to validate that the lid was actually removed and replaced within the allotted change window. Therefore, if service level agreements were not met because a lid was not replaced prior to the end of the maintenance window (or the technician was late in starting) that information may be automatically captured and reported for use in other business systems.

Figure 5:
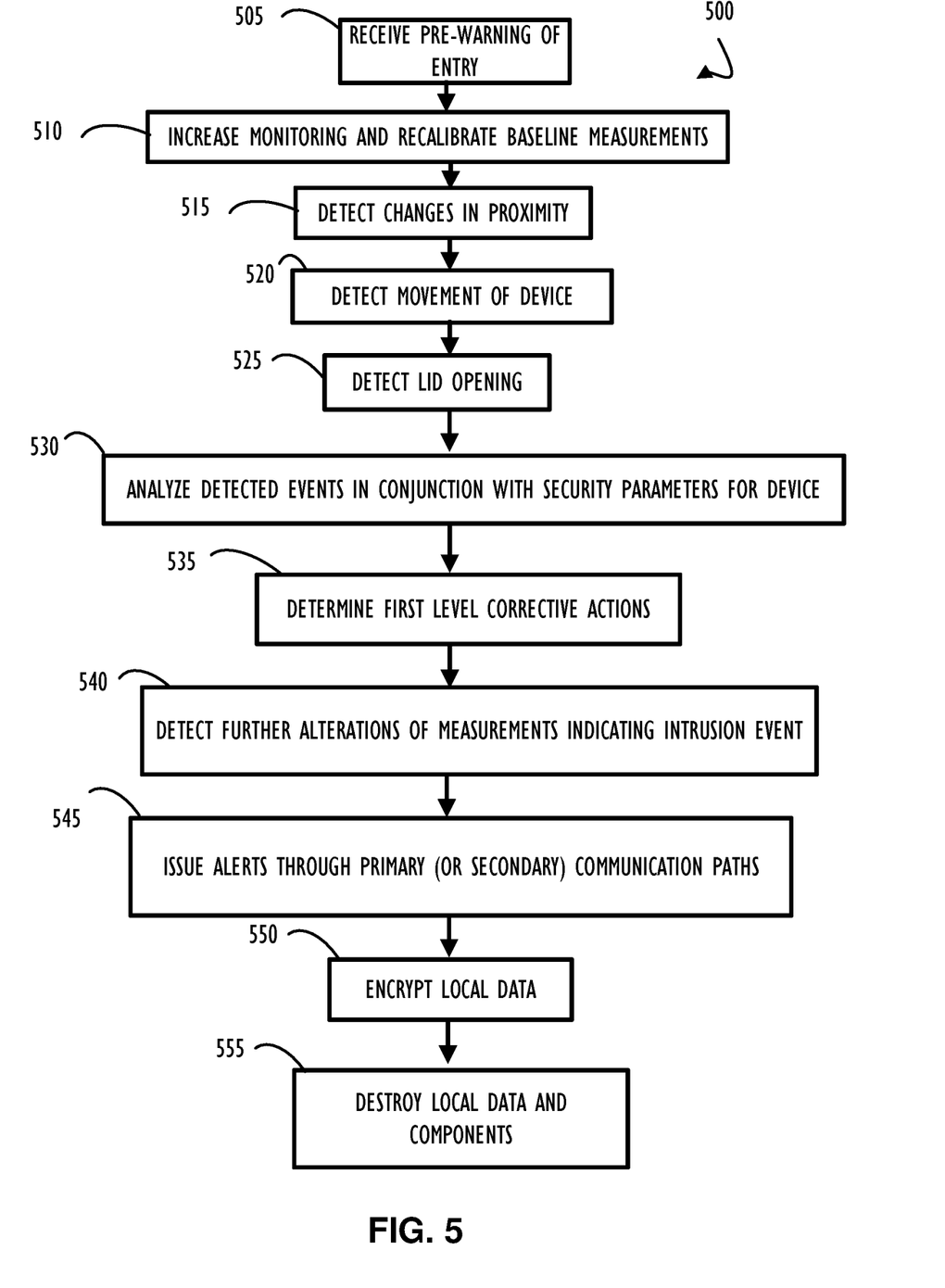
FIG. 5 is a flow chart representing a possible method to perform physical intrusion detection, according to one or more disclosed implementations.

FIG. 5 is a flow chart representing a possible method 500 to perform physical intrusion detection with possible corrective actions, according to one or more disclosed implementations. Beginning at block 505 a pre-warning of entry is received. This pre-warning of entry may come from a computer room access door, or possibly from a door or access point once-removed from the computer room access door. For example, a hallway access door or an elevator door that provides access to the outside of the computer room access door. Block 510 indicates that an increase in monitoring may be initiated in response to the pre-warning and that baseline measurements may be checked for calibration prior to opening of the computer room access door. Block 515 indicates that changes in proximity within the computer room may be detected based on entry through computer room access door. Block 520 indicates that movement of a device may be detected. Block 525 indicates that an opening of a lid of a computer system may be detected. Block 530 indicates that each of these detected events, if present, may be used with security parameters for different devices within the secure computer room to determine if unauthorized actions may be in-progress or suspected. Block 535 indicates that a first level of corrective actions may be taken. For example, issue an alert or obtain confirmation from a system administrator via a challenge response mechanism or acknowledgement of the alert. Block 540 indicates that further measurements (or an unsuccessful challenge response) may indicate an actual intrusion event. Block 545 indicates that alerts may be issued through a primary or secondary communication capability as necessary. Block 550 indicates that data may be encrypted in response to the suspected intrusion event. Block 555 indicates that data and components may be destroyed, e.g., through a "kill-pill" or electronic overload, in response to a detected intrusion event. Different levels of response may be determined based on a collective analysis of all detected intrusion measurements and sensitivity of computer systems.

Figure 6:
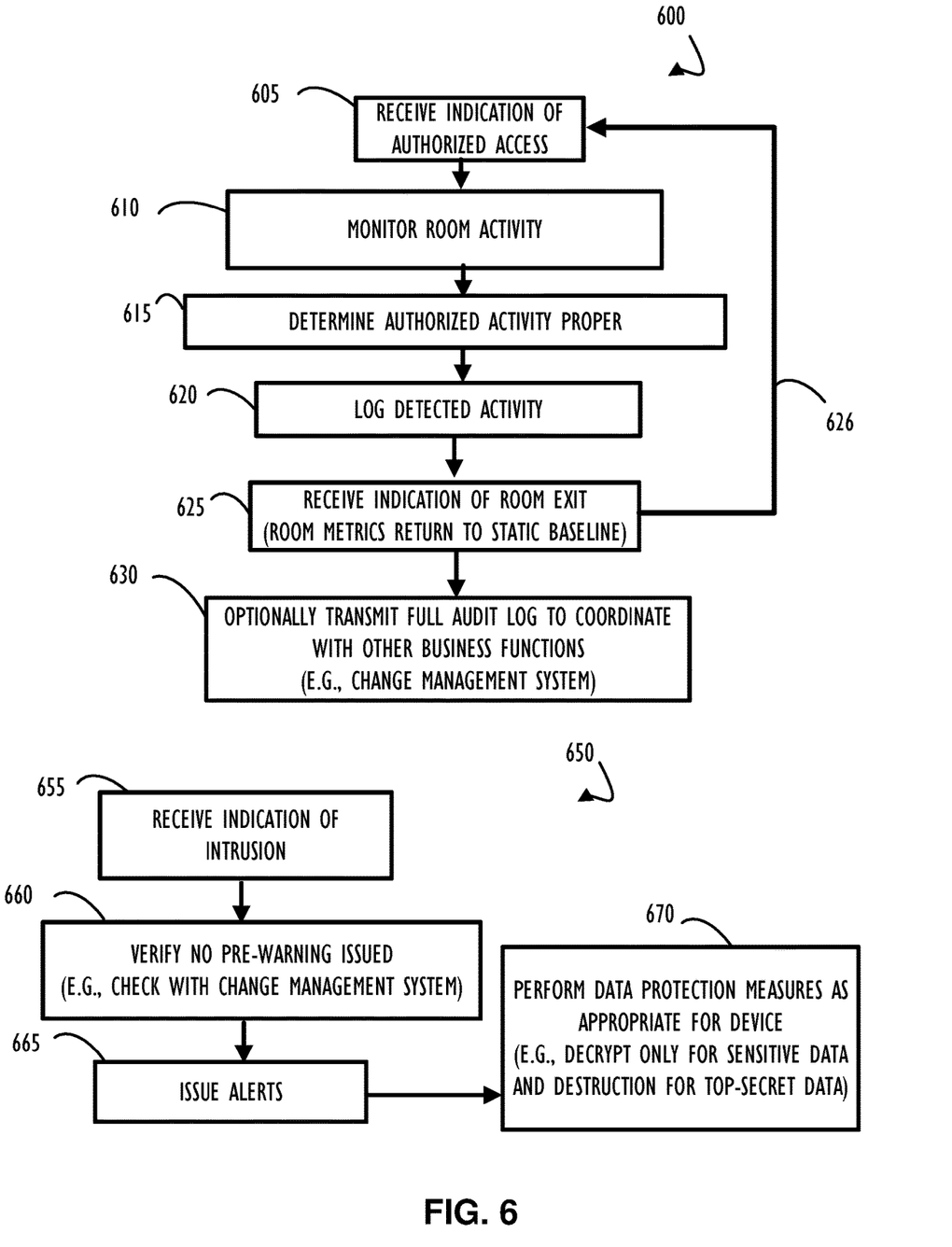
FIG. 6 represents two example methods (possibly subparts of the method of FIG. 5) that may be used on different types of devices depending on the detected events, according to one or more disclosed embodiments.

Referring now to FIG. 6, at two example methods 600 and 650 are illustrated. Each of method 600 and 650 may also represent possible subparts of method 500 illustrated in FIG. 5. Methods 600 and 650 may be used on different types of devices depending on the sensitivity of data and capability for that device, according to one or more disclosed embodiments. In the first example of FIG. 6, method 600 represents a situation where authorized access is granted, and no malicious intent is ultimately detected. Beginning at block 605, an indication of authorized access is received. For example, a person has successfully authenticated to enter a secure computer room (e.g., computer room 100 of FIG. 1). Block 610 indicates that room activity is monitored by one or more intrusion monitors (e.g., 145 of FIG. 1) in one or more devices within the secure computer room. Each of these devices may share information with each other to create a comprehensive view of movement and device access (or physical contact) within the secure computer room. For example, using RSSI measurements movements of a person between different machines may be detected and monitored. Block 615 indicates that all monitored activity is in conformance with an authorized access. For example, the employee badge that was used to access the secure computer room indicates that the employee is authorized to interact with machines as monitored. Also, a change management or incident management system may include information that a particular computer system, within the secure computer room, expects attention by this employee. That is, the incident or configuration change has been assigned to the employee associated with the badge (or biometric information) used to access the secure computer room. Block 620 indicates that any detected activity may be logged and timestamped. For example, logs could be later correlated to readings from sensors on an intrusion detection system to analyze activities leading up to, during, and after a breach. Block 625 indicates that a room exit is identified, for example, an open/close of an access door to the secure computer room and overall room metrics return to their static baseline measurements indicating no person is present within the room. Flow (626) may then return to block 605 to wait for another indication of authorized access. Additionally, block 630 indicates that all monitored activity may be logged and a full audit log may be transmitted as necessary to other systems to provide for coordinated business functions as described throughout this disclosure.

In the second example of FIG. 6, method 650 represents portions of a technique to respond to an intrusion event, according to one or more disclosed embodiments. Of course, different levels of response may be determined based on the combination of detected events preceding an actual indication of intrusion and other factors available from the overall intrusion system and other business processes. Beginning at block 655 an indication of intrusion is received, for example, at an intrusion monitor 145 of FIG. 1. Block 660 indicates that a verification that no pre-warning information is available and that this detection has a high likelihood of being an actual intrusion event. For example, a change management system (or incident management system) may be checked to ensure that there is not expected maintenance for the secure device detecting possible intrusion. Block 665 indicates that alerts may be issued to warn system administrators of a possible intrusion event. Block 670 indicates that data protection measures may be taken to respond to the actual intrusion event. Data protection measures may vary for different machines and different levels of intrusion. For example, if a machine stores data considered sensitive then an encryption of all data may be adequate, whereas, if a machine stores data considered top-secret a complete destruction of data may be warranted.

Figure 7:
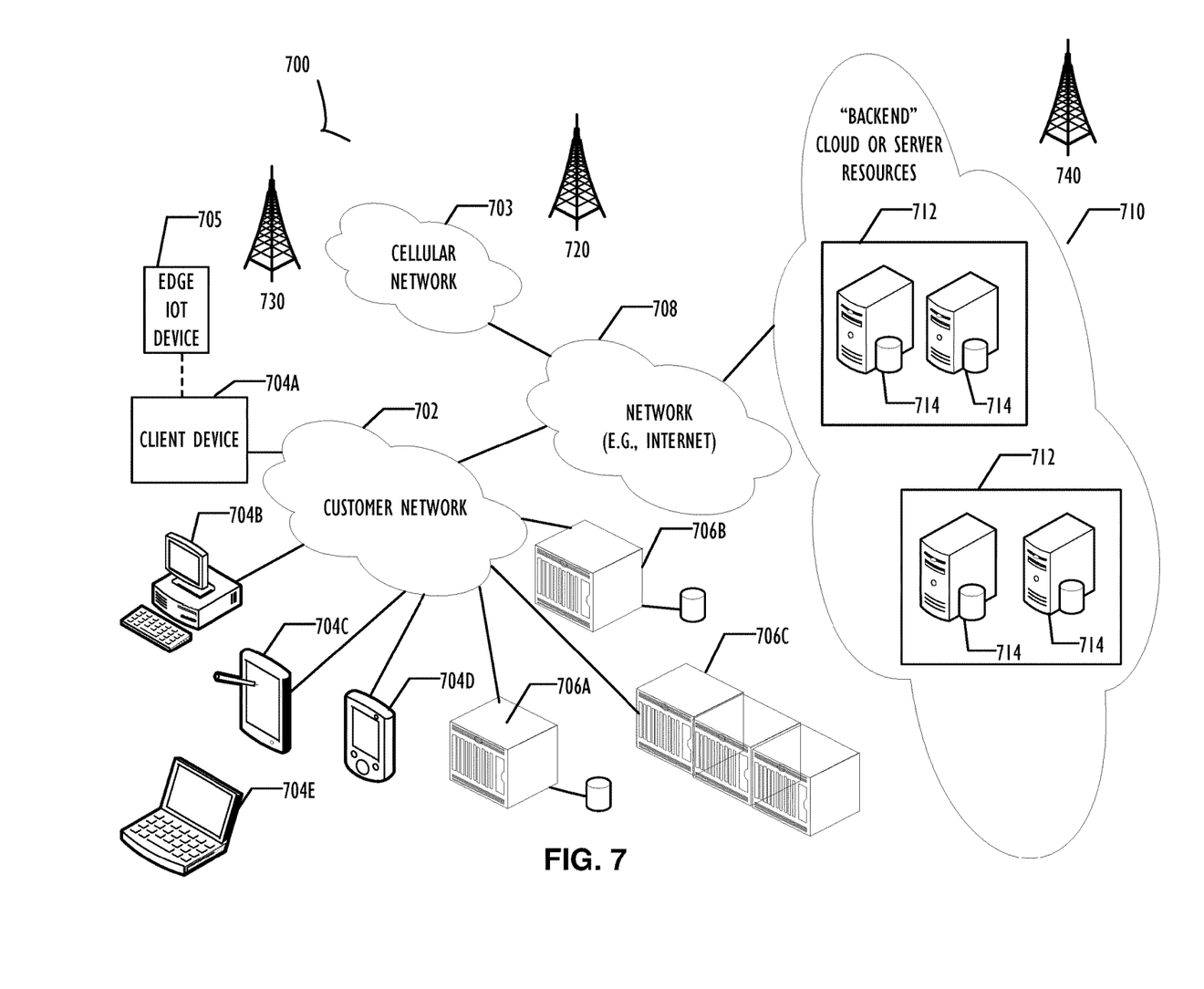
FIG. 7 represents a computer network infrastructure that may include devices equipped with an intrusion monitor device and may be used to implement all or part of the disclosed intrusion detection techniques, according to one or more disclosed embodiments.

FIG. 7 represents a computer network infrastructure 700 that may be used to implement all or part of the disclosed intrusion detection technique or may have specific computer systems equipped with the disclosed intrusion monitor device, according to one or more disclosed embodiment. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®). In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include a secure network device (or set of devices) such as that described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710.

Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more secure compute resources that may benefit from the techniques of this disclosure.

Figure 8:
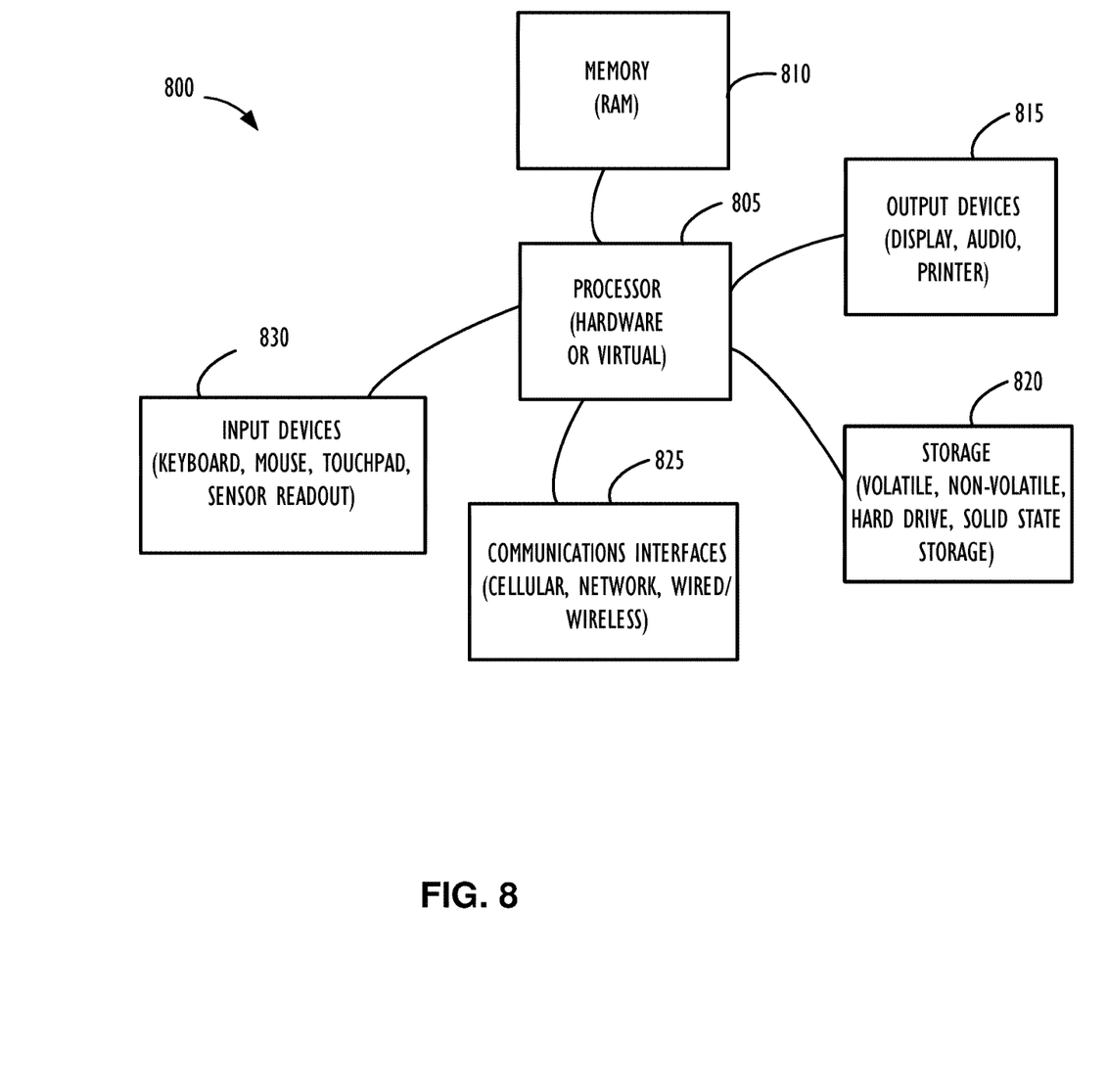
FIG. 8 illustrates a computing device that may be used to implement the functions, modules, processing platforms, execution platforms, communication devices, and other methods and processes of this disclosure.

FIG. 8 illustrates a computing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a core. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A secure computer device comprising:
a received signal strength indicator (RSSI) sensor;
a processor communicatively coupled to the RSSI sensor;
a non-transitory storage medium storing intrusion detection instructions executable on the processor to:
create a set of baseline monitoring measurements of received signal strengths as a range of signal strength values measured over an initial period of time;
receive an indication that a person has gained entry to an area outside a secure computer room;
refresh the set of baseline monitoring measurements for the secure computer device, the refresh based on including at least one signal strength value from a time after receiving the indication that the person has gained entry to the area outside the secure computer room;
increase monitoring sensitivity based on the indication that the person has gained entry to the area outside the secure computer room;
responsive to the increased monitoring sensitivity, monitor received signal strengths, obtained using the RSSI sensor, from at least one external signal emitted by a first computer system within the secure computer room, to determine a first signal strength pattern around the secure computer device;
detect a deviation from the refreshed set of baseline monitoring measurements in the first signal strength pattern, the deviation indicative of an entity obstructing the at least one external signal; and
initiate a first protective action in response to the detected deviation in the first signal strength pattern.

2. The secure computer device claim 1, wherein the intrusion detection instructions are executable on the processor to determine that the entity obstructing the at least one external signal is moving between the first computer system and the secure computer device.

3. The secure computer device of claim 1, wherein the intrusion detection instructions are executable on the processor to:
monitor received signal strengths, obtained using the RSSI sensor, from a plurality of external signals emitted by a plurality of computer systems within the secure computer room, to determine a second signal strength pattern around the secure computer device;
detect a second deviation from the refreshed set of baseline monitoring measurements in the second signal strength pattern, the second deviation indicative of the entity obstructing at least a second external signal of the plurality of external signals; and
initiate a second protective action in response to the detected second deviation in the second signal strength pattern.

4. The secure computer device of claim 1, wherein the monitoring of the received signal strengths obtained using the RSSI sensor comprises monitoring multiple external signals emitted by a plurality of computer systems, including the first computer system, within the secure computer room, to determine the first signal strength pattern.

5. The secure computer device of claim 1, further comprising:
an accelerometer communicatively coupled to the processor; and
wherein the intrusion detection instructions are executable on the processor to:
obtain measurements from the accelerometer indicative of movement of the secure computer device; and
initiate a second protective action in response to detected movement of the secure computer device.

6. The secure computer device of claim 1, further comprising:
a photocell or infrared light detector mounted internally to the secure computer device and communicatively coupled to the processor; and
wherein the intrusion detection instructions are executable on the processor to:
obtain measurements from the photocell or infrared light detector indicative of a change in ambient light within the secure computer device; and
initiate a second protective action in response to a detected change in ambient light within the secure computer device.

7. The secure computer device of claim 1, further comprising:
a lid removal detector communicatively coupled to the processor; and
wherein the intrusion detection instructions are executable on the processor to:
detect a lid opening of the secure computer device; and
initiate a second protective action in response to a detected lid opening of the secure computer device.

8. The secure computer device of claim 1, wherein the intrusion detection instructions are executable on the processor to:
receive an indication that the secure computer device is subject to maintenance for a scheduled period of time; and
suspend intrusion monitor functionality of the intrusion detection instructions for the scheduled period of time.

9. The secure computer device of claim 1, wherein the intrusion detection instructions are executable on the processor to:
receive an indication that another computer system in the secure computer room is subject to maintenance for a scheduled period of time; and
suspend monitoring of an external signal from the another computer system for the scheduled period of time.

10. The secure computer device of claim 1, wherein the intrusion detection instructions are executable on the processor to:
create an intrusion fingerprint based on a plurality of measurements from a plurality of sensors indicating possible intrusion events; and
initiate protective measures in response to the intrusion fingerprint.

11. The secure computer device of claim 10, wherein the protective measures include destruction of data or components of the secure computer device.

12. The secure computer device of claim 1, wherein the first protective action comprises initiating encryption of at least a portion of any unencrypted data on the secure computer device.

13. The secure computer device of claim 1, further comprising:
an accelerometer communicatively coupled to the processor; and
wherein the intrusion detection instructions are executable on the processor to:
obtain measurements from the accelerometer indicative of movement of the secure computer device; and
report a degree of movement of the secure computer device as part of an alert sent to a management system.

14. The secure computer device of claim 1, wherein the intrusion detection instructions are executable on the processor to integrate with a human resource function of an organization to determine security clearance information with respect to an employee identified as entering the secure computer room.

15. The secure computer device of claim 1, wherein the intrusion detection instructions are executable on the processor to:
modify the set of baseline monitoring measurements in response to activation of an overhead light in the secure computer room; and
use the modified set of baseline monitoring measurements to detect intrusion into the secure computer device.

16. A computer implemented method to perform intrusion detection on a secure computer device, the method comprising:
creating a set of baseline monitoring measurements of received signal strengths as a range of signal strength values measured over an initial period of time;
receiving an indication that a person has gained entry to an area outside a secure computer room;
refreshing the set of baseline monitoring measurements for the secure computer device, the refreshing based on including at least one signal strength value from a time after receiving the indication that the person has gained entry to the area outside the secure computer room;
increasing monitoring sensitivity based on the indication that the person has gained entry to the area outside the secure computer room;
responsive to the increased monitoring sensitivity, monitoring received signal strengths from at least one external signal emitted by a first computer system within the secure computer room, to determine a first signal strength pattern around the secure computer device, the received signal strengths that are monitored obtained using a received signal strength indicator (RSSI) sensor;
detecting a deviation from the refreshed set of baseline monitoring measurements in the first signal strength pattern, the deviation indicative of an entity obstructing the at least one external signal; and
initiating a first protective action in response to the detected deviation in the first signal strength pattern.

17. The computer implemented method of claim 16, further comprising:
receiving an indication that the secure computer device is subject to maintenance for a scheduled period of time; and suspending the intrusion detection for the scheduled period of time.

18. The secure computer device of claim 1, wherein the secure computer room has a door to allow entry into the secure computer room, and the door is between the secure computer room and the area outside the secure computer room, and wherein the indication that the person has gained entry to the area outside the secure computer room is based on a detection of the person by a sensor outside the secure computer room.

19. A non-transitory machine-readable storage medium comprising instructions that upon execution cause a secure computer device to:
- create a set of baseline monitoring measurements of received signal strengths as a range of signal strength values measured over an initial period of time;
- receive an indication that a person has gained entry to an area outside a secure computer room;
- refresh the set of baseline monitoring measurements for the secure computer device, the refresh based on including at least one signal strength value from a time after receiving the indication that the person has gained entry to the area outside the secure computer room;
- increase monitoring sensitivity based on the indication that the person has gained entry to the area outside the secure computer room;
- responsive to the increased monitoring sensitivity, monitor received signal strengths from at least one external signal emitted by a computer system within the secure computer room, to determine a signal strength pattern around the secure computer device, the received signal strengths that are monitored obtained using a received signal strength indicator (RSSI) sensor;
- detect a deviation in the signal strength pattern, the deviation indicative of an entity obstructing the at least one external signal; and
- initiating a protective action in response to the detected deviation in the signal strength pattern.

20. The non-transitory machine-readable storage medium of claim 19, wherein the instructions upon execution cause the secure computer device to:
- modify the set of baseline monitoring measurements in response to activation of an overhead light in the secure computer room; and
- use the modified set of baseline monitoring measurements to detect intrusion into the secure computer device.

* * * * *